(No Model.)

J. S. CRUM.
LISTING PLOW OR CULTIVATOR.

No. 379,863. Patented Mar. 20, 1888.

WITNESSES:
Fred G. Dieterich
P. B. Turpin

INVENTOR:
Joseph S. Crum
BY Munn & Co.
ATTORNEYS.

UNITED STATES PATENT OFFICE.

JOSEPH S. CRUM, OF STOCKDALE, KANSAS.

LISTING PLOW OR CULTIVATOR.

SPECIFICATION forming part of Letters Patent No. 379,863, dated March 20, 1888.

Application filed December 27, 1887. Serial No. 259,152. (No model.)

*To all whom it may concern:*

Be it known that I, JOSEPH S. CRUM, of Stockdale, in the county of Riley and State of Kansas, have invented a new and useful Improvement in Listing Plows or Cultivators, of which the following is a specification.

My invention is an improved listing plow or cultivator, and seeks to provide a simple construction which can be readily connected to an ordinary cultivator-frame, which may be adjusted at such connection to regulate the depth of the plows or shovels, and which will be simple and will efficiently serve the purpose for which it is designed.

The invention consists in certain features of construction and novel combinations of parts, as will be described and claimed.

Figure 1:
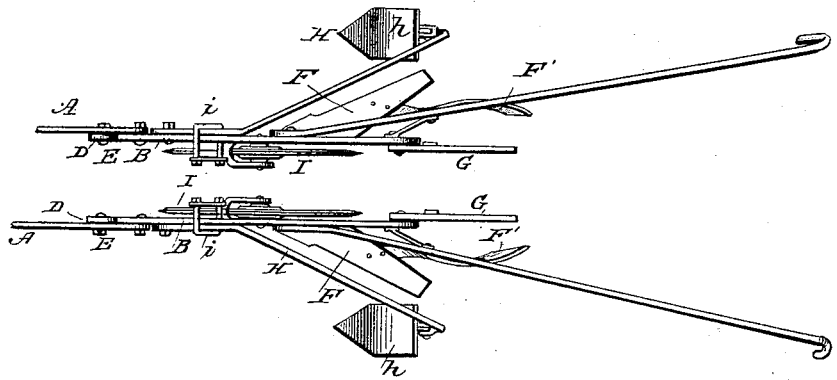
Figure 2:
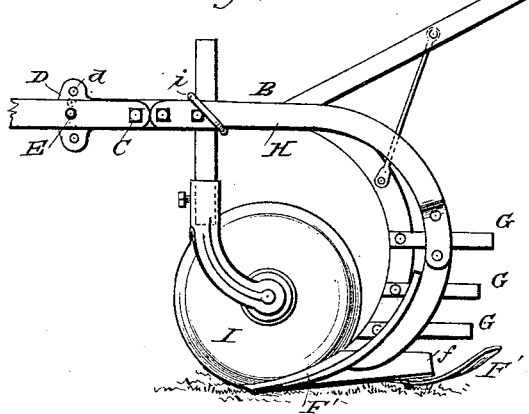
Figure 4:
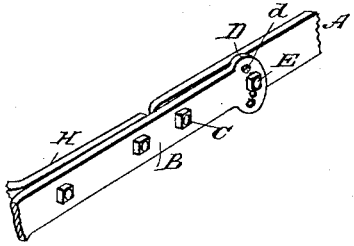
Figure 3:
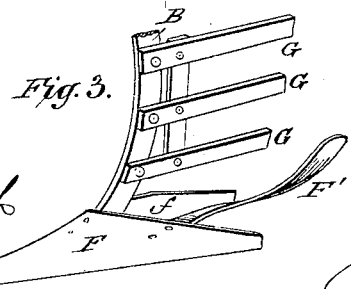

In the drawings, Figure 1 is a top view of my improvement. Fig. 2 is a side view thereof, and Figs. 3 and 4 are detail views.

The bars or beams A A are the drag-bars of a cultivator-frame. The main portion or arch and wheels of such framing are not shown, as they may be of any suitable construction, and the specific construction thereof forms no part of the present invention. In fact, the forward ends of the beams B, which preferably connect with the bars A, as shown, may be connected directly together by a cross-arch and the bars A be dispensed with.

In connecting the beams B to bars A the beams are pivoted to the bars A by means of bolts C, passed through coincident openings in bars A B. The openings in bars A for said bolts are formed near the rear ends of the said bars, while the openings for the bolts in beams B are arranged somewhat in rear of the forward ends of the beams, portions or extensions of the beams being in advance of the pivots, as shown in Figs. 1 and 2. At their forward ends the beams have an adjustable connection with the drag-bars, attained by providing widened portions D, provided with a series of bolt-holes, *d*, for the bolts E, which clamp them to the bars A, by the adjustment of which bolt into any of the openings *d* the beam may be set up or down to regulate the depth.

The shares F are secured on the lower rear ends of the beams, and are provided with landsides *f* and with auxiliary cutters or blades F'. While this curved form of blade is preferred, it is obvious that it may be replaced by a flat share or share cutting on a level without departing from some of the principles of the invention.

To the beam above the share I secure slats or bars G, which are secured at or near their forward ends to the beams and project rearwardly from the beam, as shown in Figs. 1 and 2. These slats G extend high enough on the beam and project sufficiently in rear thereof to protect the standing corn or other crop as the plows are passing along the rows in the operation of plowing.

Cultivator-beams H are attached at their forward ends to the beams B and diverge rearwardly therefrom, being provided at their lower ends with suitable shovels, *h*.

Colters I, which may be rolling colters, as shown, or blade-colters, if desired, have their shanks secured by clips *i* to the beams B. These colters run near the front cutting-points of the landsides and serve to cut cornstalks, vines, weeds, and other obstructions, and serve in part as fenders.

The implement is intended for cultivating corn, cotton, tobacco, and other crops planted in rows.

The auxiliary blades are adjustable and reversible in order to throw the dirt to or from the growing crop to any desired degree.

Having thus described my invention, what I claim as new is—

1. The combination of the drag-bars, the beams B B, connected adjustably to said drag-bars and provided at their lower ends with the shares, the cultivator-beams connected with beams B and provided with shovels, and the colters also connected with the beams B, substantially as set forth.

2. The combination, with the beam and the share supported thereon, of the slats connected at their forward ends to the beam above the share and projected rearwardly from said beam in series one above the other, substantially as set forth.

3. The combination of the beam B, the share thereon provided with auxiliary blade or cutter F', and the slats arranged in series one above the other and connected at their forward ends with the beam B above the share, substantially as set forth.

4. The combination of the beams B B, the shares supported on the lower rear ends of the beams B, the slats or bars G, arranged in series above the shares and secured to and projected rearwardly from the beams B, the cultivator-beams H, having shovels $h$, and the colters I, substantially as set forth.

JOSEPH S. CRUM.

Witnesses:
J. L. REYNOLDS,
J. O. BUCK.